Jan. 17, 1967  D. J. CUPEDO  3,298,659
FLUID POWER ACTUATED BUTTERFLY VALVE OR PLUG COCK
Filed Oct. 14, 1963  2 Sheets-Sheet 2
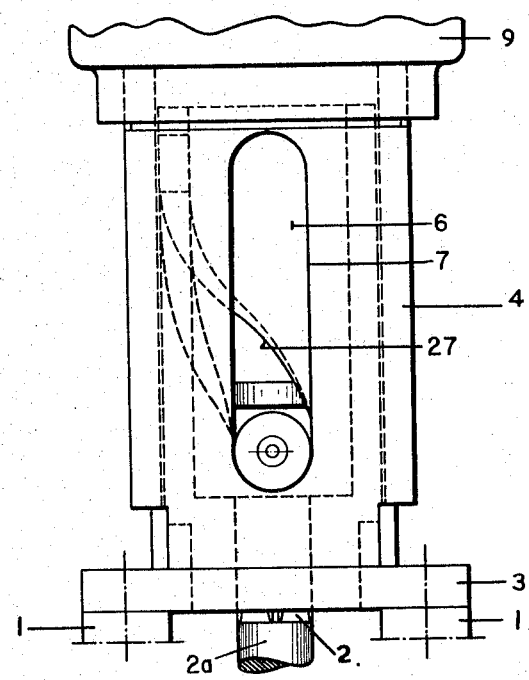
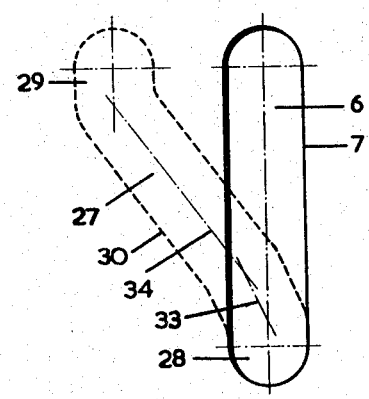
INVENTOR.

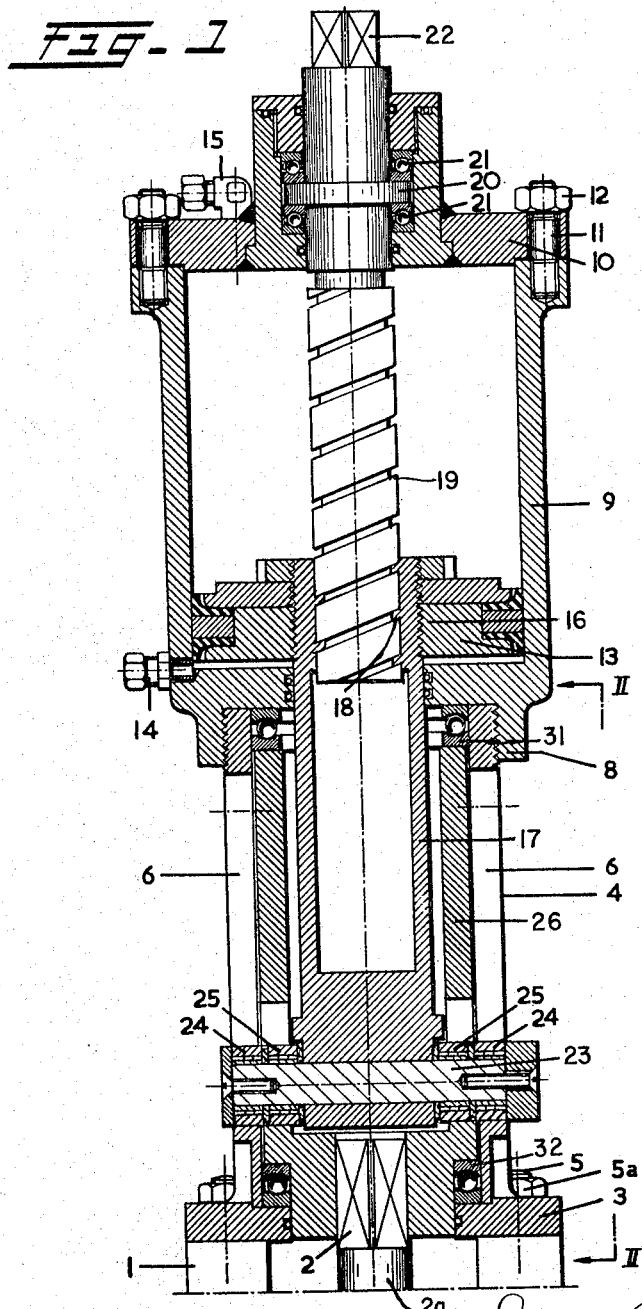

3,298,659
Patented Jan. 17, 1967

3,298,659
FLUID POWER ACTUATED BUTTERFLY VALVE OR PLUG COCK

Douwe Janse Cupedo, Prof. Bolklaan 13, Rotterdam, Netherlands
Filed Oct. 14, 1963, Ser. No. 316,046
Claims priority, application Netherlands, Dec. 21, 1962 287,127
2 Claims. (Cl. 251—14)

This invention relates to a fluid power actuated butterfly valve or plug cock.

It is an object of the invention to provide a possibility for a butterfly valve or plug valve to be opened and closed hydraulically or pneumatically from a remote point.

According to the present invention, there is provided a butterfly valve or plug cock actuated by fluid power through the intermediary of an axially movable actuating rod disposed in alignment with the rotatable spindle of the valve, said actuating rod being provided with at least one radial projection which is influenced by the edges of two concentric slots, one of said slots extending axially throughout its length and being formed in a member fixedly connected to the valve body, the other of said slots having a substantially helical configuration with axial end portions and being formed in a cylindrical member surrounding said actuating rod, said cylindrical member being mounted for rotary movement only and being connected to the valve spindle so as to be restrained from rotation relative to said spindle.

Since the length of the cylindrical member depends on the angle of pitch of the helical slot, which has to effect a rotation of no more than 90° to move the butterfly valve or plug cock from the closed position to the entirely open position or vice versa, and the length of the stroke of the actuating rod is at most equal to, and the length of this rod only slightly greater than the length of the cylindrical member, the overall height of the mechanism to be placed on the valve may be relatively small, such height being virtually independent of the capacity of passage of the butterfly valve.

In a preferred embodiment of the invention, the actuating rod is hollow and is internally threaded over part of its length to cooperate with a threaded spindle which is mounted for rotary movement only and is arranged to enable the valve to be opened and closed manually.

Since the threaded spindle is housed in the hollow actuating rod, the manually operated mechanism does not result in any substantial increase of the overall structural height.

One embodiment of the invention will now be described, by way of example, with reference to the accompanying drawings, in which FIG. 1 is a longitudinal section of the hydraulically or pneumatically operated mechanism for a butterfly valve (not further shown), FIG. 2 is a view of the showing in FIG. 1 between the lines II—II, and FIG. 3 is a development of a pair of slots.

Of the valve proper, FIGS. 1 and 2 only show the recessed upper face of its cover 1, as well as the end of the valve spindle *2a* with square 2. Bearing on the recessed faces is a flange 3 of a cylinder 4 which is mounted on the pillar ends by means of studs 5 and nuts *5a* and is provided with two diametrically opposed axial slots 6 with edges 7.

The top end of cylinder 4 is provided with a screw thread 8, on which a second cylinder 9 with a cover 10 is screwed. The latter part is secured to cylinder 9 in a fluid-tight fashion by means of studs 11 and nuts 12. A piston 13 of otherwise conventional construction is mounted in the second cylinder for up and down movement, depending on whether power fluid is admitted via inlet 14 or 15.

Piston 13 is connected by means of threading 16 with a hollow actuating rod 17, which has an internal screw thread 18 at its upper end to engage a threaded spindle 19 which is mounted for rotary movement only and is restrained from axial movement by a collar 20 between pressure ball bearings 21, and has a square 22 mounted at its top end for a hand wheel (not shown) to be mounted thereon.

Since screw thread 18 is so steep that it has no self-braking action, it does not by any means prevent the up and down movement of piston 13. This movement of the piston, and therewith of the hollow rod 17, results in that a cross-axle 23 mounted in the lower end of rod 17 and carrying at its ends, which project radially from said rod, rollers 24, 25 supported on needle-bearings or the like, will cause a cylindrical member 26 to be rotated about its axis. Since rollers 24 are guided in slots 6 and lock rod 17 from rotation, and rollers 25 are moved in two diametrically opposed, generally helical slots 27 with axial ends 28, 29 and edges 30, which are formed in cylindrical member 26, the said member 26 will be forced to rotate.

The cylindrical member is connected with the square 2 of the spindle *2a* of the butterfly valve or plug so as to be locked from rotation relative to it, so that the spindle will rotate along with it. The angle through which rotation is effected is about 90°, i.e., from the closed position to the open position of the valve or the other way round, depending on the direction of movement of piston 13 with rod 17.

Cylindrical member 26 is restrained from axial movement by two pressure ball bearings 31, 32, bearing 32 constituting at the same time a means for centering the lower end of member 26.

Slots 27 comprise a short axial section 28, a section 33 at a small angle to the axis of cylinder 26, the actual helical section 34 (rectilinear in the development shown in FIG. 3) at a larger angle to the axis of cylinder 26, i.e. a smaller angle of inclination, and another axial section 29.

The axial sections are both for fixing the valve either in its closed or in its open position.

Inclined section 33, which is at a small angle to the axis of cylinder 26, is arranged to exert a great force, necessary to overcome the friction fit of the butterfly valve or plug in its seat.

Section 34, which becomes active when the valve element has turned through an angle of approximately 15°, only needs to produce forces which ensure that the valve will rotate further. In conjunction with the diameter of piston 13, section 34 even allows of being made only slightly inclined, which is an advantage as far as the overall structural height of the machanism is concerned.

It will be evident that it is possible to effect modifications in minor points without departing from the spirit and scope of the invention.

I claim:
1. Means for actuating a butterfly valve comprising a valve body, a rotatable spindle for said valve, an axially movable actuating rod disposed in alignment with said rotatable spindle, a member fixedly connected to said valve body extending axially throughout its length having a slot, a cylindrical member surrounding said actuating rod mounted for movement only connected to said spindle so as to be restrained from rotation relative to said spindle having a slot having a substantially helical configuration with axial end portions concentric wtih said first named slot, one of said axial end portions locking said valve in closed position, said actuating rod having at least one radial projection cooperating with the edges of said two concentric slots, the helical configuration of said second named slot in said cylindrical member comprising two sections which are at an angle relative to each other, one of said sections which immediately follows the axial end portion which locks the valve in its closed position being at a smaller angle to the axis of said cylinder than the other of said helical sections, a threaded spindle mounted for rotary movement only is provided and said actuating rod is hollow and is internally threaded over part of its length to cooperate with said threaded spindle to enable the valve to be opened and closed manually.

2. Means according to claim 1, wherein said actuating rod is coupled with a piston mounted for axial up and down movement in a cylinder receiving pressure fluid, said threaded spindle extending coaxially in said cylinder throughout its length.

References Cited by the Examiner

UNITED STATES PATENTS

| | | | |
|---|---|---|---|
| 2,315,775 | 4/1943 | D'Arcey | 251—58 |
| 2,414,032 | 1/1947 | Fawkes | 74—625 X |
| 2,953,344 | 9/1960 | Yancey | 251—58 |
| 2,998,805 | 9/1961 | Usab | 92—33 |

FOREIGN PATENTS

| | | |
|---|---|---|
| 824,810 | 12/1959 | Great Britain. |
| 905,091 | 9/1962 | Great Britain. |

M. CARY NELSON, *Primary Examiner.*

ARNOLD ROSENTHAL, *Assistant Examiner.*